United States Patent [19]

Gordy et al.

[11] 4,186,349

[45] Jan. 29, 1980

[54] ADAPTIVE NARROW BAND NOISE ESTIMATOR/SUPPRESSOR RADIO RECEIVER

[75] Inventors: Robert S. Gordy, Largo; Ramon P. Chambers, Clearwater; David E. Sanders, St. Petersburg, all of Fla.

[73] Assignee: E-Systems, Inc., Dallas, Tex.

[21] Appl. No.: 864,768

[22] Filed: Dec. 27, 1977

[51] Int. Cl.² .............................................. H04B 1/10
[52] U.S. Cl. ....................................... 325/323; 325/42
[58] Field of Search ................. 325/323, 321, 473, 42, 325/324, 41; 178/88

[56] References Cited

U.S. PATENT DOCUMENTS

| | | | |
|---|---|---|---|
| 3,202,990 | 8/1965 | Howells | 325/323 |
| 3,437,937 | 4/1969 | Warfield | 325/478 |
| 3,474,342 | 10/1969 | McGee et al. | 325/473 |
| 3,614,626 | 10/1971 | Dillard | 325/323 |
| 3,737,799 | 6/1973 | Stander | 325/475 |
| 3,757,226 | 9/1973 | Stover | 325/323 |
| 3,792,356 | 2/1974 | Kobayashi | 325/323 |
| 3,868,577 | 2/1975 | Watt | 325/473 |
| 3,902,123 | 8/1975 | Domen | 325/478 |
| 3,988,679 | 10/1976 | Clarke et al. | 325/377 |
| 4,017,798 | 4/1977 | Gordy | 325/42 |
| 4,021,738 | 5/1977 | Gitlin | 325/42 |
| 4,032,847 | 6/1977 | Unkauf | 325/473 |

OTHER PUBLICATIONS

"Detection, Estimation, and Modulation Theory", Part 1, Van Trees, Wiley & Sons, 1968, p. 296.

Primary Examiner—John C. Martin
Assistant Examiner—Michael A. Masinick
Attorney, Agent, or Firm—Robert V. Wilder

[57] ABSTRACT

A radio receiver is disclosed which measures the statistics of an interfering narrow band noise signal and from these statistics generates a function which when mixed at baseband with a data signal combined with the narrow band noise reduces the interfering effect of the noise signal. The interference eliminating function is generated by processing signals representing an approximation of the data, the covariance of the narrow band noise interference, the noise figure for the receiver and the amplitude of the data signal. As the function is generated it is input to a mixer together with the combined narrow band noise and data signal. Iterated processing improves the estimation for the noise statistics thereby improving the approximation for the resulting data signal. This further enhances the solution for the noise elimination function thereby still further improving the desired data signal, thus creating a positive improving feedback loop.

22 Claims, 2 Drawing Figures

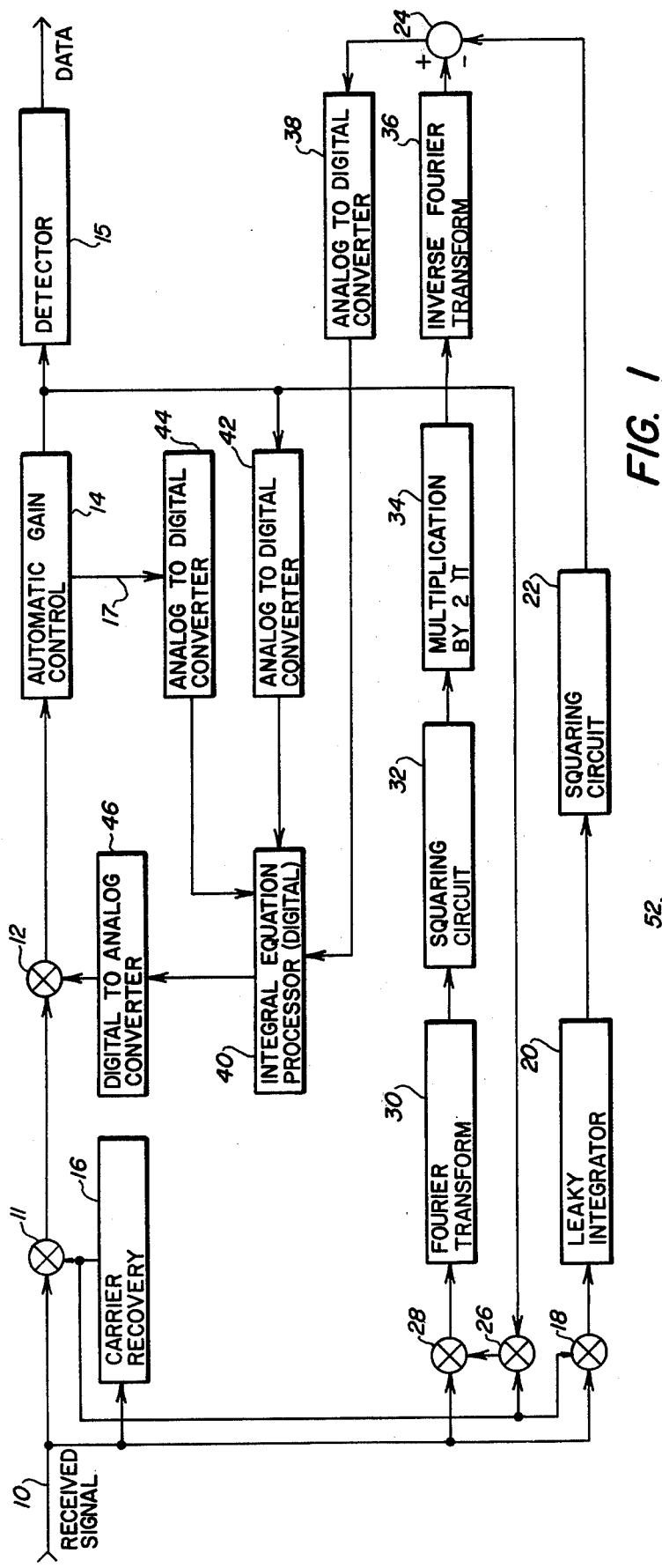
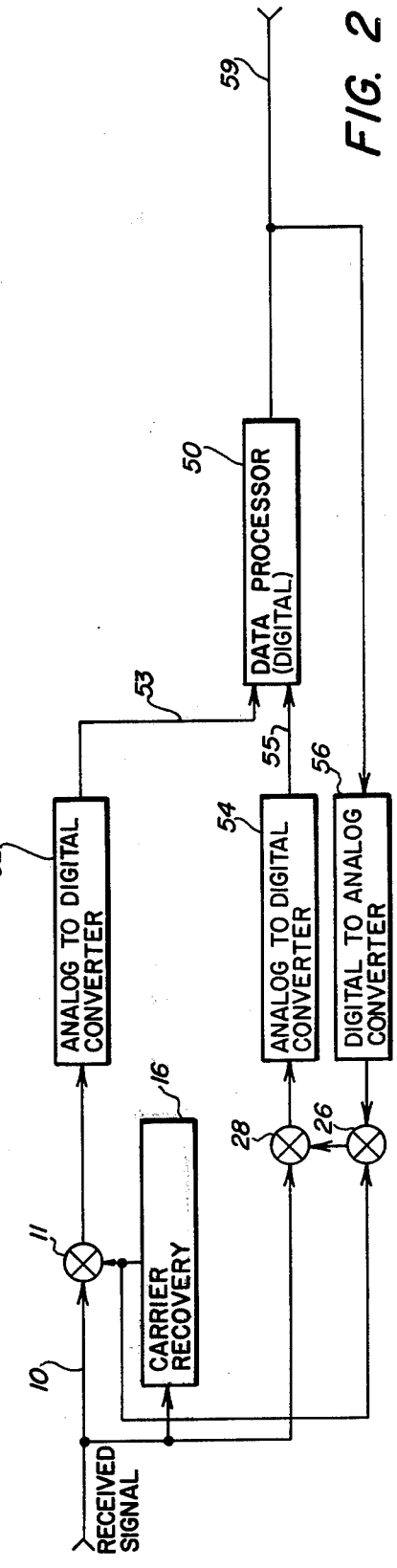
FIG. 1
FIG. 2

ADAPTIVE NARROW BAND NOISE ESTIMATOR/SUPPRESSOR RADIO RECEIVER

BACKGROUND OF THE INVENTION

This invention relates to radio receiving apparatus and more particularly to apparatus for minimizing the interfering effect of a narrow band noise signal superimposed upon the desired signal.

Heretofore, the most common technique for minimizing the interfering signal effect is to reduce the received bandwidth down to that of the desired signal to thereby eliminate adjacent interfering signals. However, this is not effective when the interfering signal is concentrated in the same spectrum segment as the desired signal. Therefore, there exists a need for apparatus to minimize the interfering effect of superimposed narrow band noise.

The present invention adaptively measures the statistics of the interfering noise signal, and by using these statistics together with approximations of the received data signal, generates an interference eliminating function which when multiplied by the combined narrow band noise and data signals tends to reduce the interfering effect of superimposed noise.

SUMMARY OF THE INVENTION

In accordance with the present invention there is provided a radio receiver wherein the received signal comprises a carrier, data and interfering narrow band noise. First means are provided to generate a first signal responsive to the received signal and the recovered carrier. A second means generates a second signal responsive to the received signal and the data signal and a third means processes the data signal, first signal and second signal to produce a data signal free of the interfering noise signal.

The apparatus generates a noise statistic signal utilizing the data signal and signals proportional to the covariance of the interfering noise and the noise figure of the radio receiver. The noise statistic signal and the baseband combined noise and data signal are input to a mixer wherein the output is the data signal with the interfering effect of the noise reduced.

BRIEF DESCRIPTION OF THE DRAWINGS

For a more complete understanding of the present invention and advantages thereof, reference is now made to the following description taken in conjunction with the following drawings:

FIG. 1 is a block diagram of an adaptive narrow band noise estimator/suppressor of the present invention; and FIG. 2 is a block diagram of an alternative embodiment of the present invention.

DETAILED DESCRIPTION OF THE INVENTION

Radio receiving apparatus in accordance with the present invention is shown in FIG. 1. A received radio frequency signal is input on a line 10 to a mixer 11, a carrier recovery circuit 16, a mixer 28, and a mixer 18.

The carrier recovery circuit 16 provides a second input to the mixer 11 which generates an output signal that is supplied to a mixer 12. Carrier recovery circuit 16 also provides a first input to a mixer 26. The output of the mixer 12 is provided to an automatic gain control circuit 14 which conveys a signal to a detector 15 and to an analog-to-digital converter 42. The digital output of the converter 42 is provided as one input to an integral equation processor 40 that generates an output signal which is processed through a digital-to-analog converter 46 and supplied as an input to the mixer 12.

The automatic gain control circuit 14 also generates a control signal output on line 17 which is processed through an analog-to-digital converter 44 and supplied as a second input to the integral equation processor 40.

The data signal to the detector 15 is also a second input to the mixer 26 which generates the second input signal to the mixer 28. The output signal from the mixer 28 is passed in sequence through a Fourier transform circuit 30, a squaring circuit 32, a multiplication by $2\pi$ circuit 34 and an inverse Fourier transform circuit 36 to a summer 24. The output of the summer 24 is passed through an analog-to-digital converter 38 and supplied as a third input to the integral equation processor 40.

The carrier recovery circuit 16 also provides a second input to the mixer 18 which generates an output that is passed through a leaky integrator circuit 20 and a squaring circuit 22 and applied to the negative port of the summer 24.

Referring now to FIG. 1 for an operational description of the present invention, a received radio frequency signal is input on line 10 to the mixer 11 where it is mixed with a recovered carrier signal produced by the carrier recovery circuit 16. A circuit for implementing the carrier recovery circuit is a phase locked loop.

The mixer 11 generates a baseband signal comprising both the desired data signal and any noise within the same bandwidth as the data. The output of the mixer 11 is provided as an input to the mixer 12 along with a noise statistic signal which has been generated by the integral equation processor 40. This noise statistic signal is such that when it is mixed with the combined baseband noise and data it substantially reduces the noise level and produces a data signal with substantially less interference. The data signal is then transfered to an automatic gain control circuit 14 which generates an equalized amplitude data signal that is supplied to detector 15 and a gain control signal on line 17.

For analog data, detector 15 can be implemented as a conventional envelope detector but for digital data it is implemented as a matched filter.

The analog data signal output from the automatic gain control circuit 14 is processed through the analog-to-digital converter 42 to provide a first digitized input to the integral equation processor 40. Likewise, the gain control signal on line 17 is passed through the analog-to-digital converter 44 to provide a second input to the integral equation processor 40.

The data signal produced by the automatic gain control circuit 14 and the recovered carrier are provided as inputs to the mixer 26 which generates a modulated noise free carrier which is provided as one input to the mixer 28. The second input to the mixer 28 is the received radio frequency signal and the product resulting from the mixing of these two signals is the noise signal at baseband. The baseband noise is then processed through a series of four steps to produce its correlation function. These four steps comprise taking the Fourier transform, squaring the Fourier transform, multiplying the square by $2\pi$ and then taking the inverse Fourier transform of that product. The correlation signal thus produced is then provided to the additive input port of the summer 24.

The recovered carrier and the input radio frequency signal are provided as inputs to the mixer 18 which produces an output at baseband comprising the combined noise and data signals. This baseband combination signal is then input to a leaky integrator 20 which produces the mean of this signal over a predetermined sample period. This mean is then processed through the squaring circuit 22 and then provided to the subtractive input port of the summer 24.

In the summar 24 the squared mean of the narrow band combined noise and data signals is subtracted from the correlation of the noise to produce a signal proportional to the covariance of the noise which signal is provided as the input to the analog-to-digital converter 38. The digitized covariance signal is then provided as the third input to the integral equation processor 40, as previously mentioned.

The integral equation processor 40 iteratively solves the following equation:

$$\sqrt{E}\, s(t) = \frac{N_o}{2} g(t) + \int_{T_i}^{T_f} K_c(t,u)\, g(u)\, du \qquad (1)$$

in which:
(1) g(t) and g(u) are the noise statistic signal generated by the integral equation processor 40,
(2) $N_o$ is the noise figure for the receiver,
(3) $T_i$ is the start of the predetermined sample period,
(4) $T_f$ is the end of the sample period,
(5) $K_c(t,u)$ is the covariance of the narrow band noise,
(6) E is the amplitude of the data signal, and
(7) s(t) is the data.

The integral equation processor 40 solves for the function g(t) through an iterative process to determine the best solution to balance the equation.

The term $N_o$ is the noise figure for the receiver and consists of the fixed noise for the receiver plus the noise level associated with the system due to the gain at any one particular time. This variable gain is determined by the gain control function which is the output of the automatic gain control circuit 14 on line 17. The gain control function also provides the amplitude level E for the resulting data signal.

The data function s(t) is provided to the integral equation processor 40 through the analog-to-digital converter 42. The covariance of the noise, $K_c(t,u)$, is the output signal from the summer 24 and is digitized for the integral equation processor 40 by the analog-to-digital converter 38.

The integral equation processor 40 is a microprocessor Model 8080 made by Intel Corp. The technique for programming this microprocessor to solve the equation (1) is described in the 8080 Microprocessor Application Manual.

The starting and stopping times, $T_i$ and $T_f$, are start and stop points for a predetermined sample time period which is primarily a function of the data transmission rate.

The integral equation which produces the noise statistic function is described in "Detection, Estimation, and Modulation Theory", Part I, by Harry L. Van Trees, Copyright 1968 by John Wiley and Sons, on pp. 296 and 389. This function is derived so that when it is mixed with the baseband combined noise and data signals it will substantially reduce the noise and produce an interference free data signal.

The covariance signal $K_c(t,u)$, which is the output of the summer 24, is produced using the equation:

$$K_c(t,u) = R_c(t,u) - N_x N_u \qquad (2)$$

where:
(a) $R_c(t,u)$ is the correlation of the narrow band noise signal,
(b) $N_x$ is the amplitude of the mean at a time x, and
(c) $N_u$ is the amplitude of the mean at a time u.

If the sample period over which the integration takes place is sufficiently long, the means $N_x$ and $N_u$ will be approximately equal, therefore the measured mean as generated by the leaky intergrater 20 may be squared to produce the product $N_x N_u$.

The correlation signal $R_c$ is generated from the narrow band noise signal output of the mixer 28. The signal spectrum $F_c(\omega)$ of the narrow band noise is the Fourier transform of the noise itself and the power density spectrum $S_c(\omega)$ is related to the signal spectrum through the relationship:

$$S_c(\omega) = 2\pi\, F_c(\omega)^2 \qquad (3)$$

The inverse Fourier transform of the power density spectrum $S_c(\omega)$ is the correlation of the narrow band noise. This procedure is implemented as the narrow band noise signal sequentially passes through the Fourier transform circuit 30, the squaring circuit 32, the multiplication by 2 circuit 34 and the inverse Fourier transform circuit 36. Thus, the covariance of the narrow band noise is produced when the squared circuit signal is subtracted from the correlation signal in summer 24.

The Fourier transform 30 and inverse Fourier transform 36 are implemented as surface acoustic wave devices in this embodiment, but can optionally be high-speed digital integrated circuit Fourier transform processors such as the Model TDC-1003J manufactured by TRW, Inc.

The squaring circuits 22 and 32 as well as the multiplication by $2\pi$ circuit 34 are implemented as amplifiers. The leaky integrator 20 is an RC circuit with a time constant set to be the same as the given sample period for the desired data.

The interfering noise and the desired data have approximately the same bandwidth, therefore, the analog-to-digital and digital-to-analog converters operate with signals of this bandwidth. The integral equation processor 40 operates at a speed substantially faster than the bandwidth of the noise or data in order to produce a continuous noise statistic signal. The processor works at such a speed that the noise statistic signal produced is delayed only a small and insignificant length of time relative to the baseband combined noise and data signals.

The present invention operates as a self-improving system whereby at the start, the data signal present on line 15 is but an approximation. Likewise the covariance signal produced by the summer 24 and the control function produced by the automatic gain control 14 are approximations. These signals are input to the integral equation processor 40 which solves for a noise statistic function signal which also is an approximation. This approximate noise statistic function signal is then mixed with the baseband combined noise and data signal to produce an improved data signal which then improves the covariance estimation signal and the gain control function to thereby improve the noise statistic function. The improved noise statistic function is then mixed with the combined data and noise signals to produce an even further improved data signal. This feedback process continues until a steady state is reached in which the narrow band noise is substantially removed from the desired data signal.

In FIG. 2 there is shown an alternate embodiment of the present invention in which all signals at baseband are processed digitally. The received radio frequency signal on line 10 is input to the mixers 11 and 28 and to the carrier recovery circuit 16 as described for the embodiment of FIG. 1.

The output of the mixer 11 is the combined data signal and narrow band noise signal and this is input to an analog-to-digital converter 52 which provides a first digital input to a data processor 50.

The narrow band noise signal at baseband is the output of the mixer 28 and is processed through an analog-to-digital converter 54 to provide a second digital input to the data processor 50.

The output of data processor 50 on line 59 is the data signal which is passed through a digital-to-analog converter 56 and the resulting analog signal is one input to the mixer 26.

Data processor 50 is a high speed digital micorprocessor as described for the integral equation processor 40 in FIG. 1. However, processor 50 performs digitally many of the functions accomplished with analog circuits in the embodiment of FIG. 1. The added functions which are performed digitally are the mixing of the combined data and noise with the noise statistic signal as done by mixer 12, the amplitude control function provided by the automatic gain control circuit 14, generation of the amplitude signal for the data, derivation of the receiver noise figure, production of the covariance of the narrow band noise, and the operation of a detector to produce a final data signal.

The data processor 50 utilizes the two digital inputs on lines 53 and 55 to generate the digital data output by solving the integral equation (1). The digital signal on line 53 is the combined noise signal and data signal and this signal is digitally mixed with the noise statistic signal g(t) derived from equation (1). The product of this digital mixing is the digital data signal s(t) which not only is the ultimate output signal but is also used in solving equation (1) and is provided as a feedback signal to the mixer 26.

The digital signal on line 55 comprises the noise signal at baseband, and through digital processing equivalent to the technique described for the embodiment of FIG. 1, the data processor 50 produces the covariance of the noise signal. This covariance quantity is utilized in the solution of the equation (1).

The term E represents the amplitude of the data s(t) and is carried within the data processor 50 which also maintains the noise figure $N_o$ for the receiving system.

The data processor 50 iteratively solves equation (1) updating the solution as new data arrives. The processor must work at such a speed that the time delay between the received signal and data signal is very small as compared to the bandwidth of the received signal.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A receiver apparatus for extracting a data signal from a received signal which has included therein an interfering noise signal, comprising in combination:
    (a) means for recovering a carrier signal from the received signal, the recovered carrier signal corresponding to the carrier signal modulated to carry the data signal,
    (b) means for mixing the recovered carrier signal with the received signal to produce a baseband signal which includes both the data signal and the noise signal,
    (c) means for generating a recovered modulated carrier signal by mixing the data signal with the recovered carrier signal,
    (d) means for deriving the noise signal by mixing the recovered modulated carrier signal with the received signal,
    (e) means for generating a noise correlation signal by operating on the derived noise signal, the noise correlation signal representing an approximation of the correlation of the noise signal over a sample period having a predetermined duration,
    (f) means for generating a squared mean signal by operating on the baseband signal, the squared mean signal representing an approximation of the square of the mean of the noise signal over the sample period,
    (g) means for generating a covariance noise signal by producing the difference of the noise correlation signal and the squared mean signal,
    (h) means for generating a noise statistic signal derived from a combination of the covariance noise signal, the data signal, and a noise figure signal representing the receiver apparatus noise figure, the noise statistic signal adapted to reduce the interfering effect of the noise signal when the noise statistic signal is mixed with the baseband signal, and
    (i) means for mixing the baseband signal with the noise statistic signal to produce the data signal having the noise signal essentially removed therefrom.

2. A receiver apparatus as recited in claim 1 wherein said means for recovering a carrier signal comprises a phase locked loop circuit having the received signal input thereto.

3. A receiver apparatus as recited in claim 1 wherein said means for generating a squared mean signal comprises,
    (a) means for generating a mean baseband signal by continuously integrating the baseband signal over the sample period, and
    (b) means for producing the squared mean signal by squaring the mean baseband signal.

4. A receiver apparatus as recited in claim 1 wherein said means for generating a noise correlation signal comprises,
    (a) means for generating a transform signal from the derived noise signal, the transform signal representing an approximation of the Fourier transform of the noise signal,
    (b) means for generating a squared transform signal by squaring the transform signal, (c) means for generating a product signal by multiplying the squared transform signal by the quantity $2\pi$, and (d) means for producing the noise correlation signal by generating the inverse Fourier transform of the product signal.

5. A receiver apparatus as recited in claim 4 wherein said means for generating a transform signal comprises a surface acoustic wave device.

6. A receiver apparatus as recited in claim 4 wherein said means for generating a squared transform signal is an amplifier.

7. A receiver apparatus as recited in claim 4 wherin said means for generating a product signal comprises an amplifier.

8. A receiver apparatus as recited in claim 4 wherein said means for producing the noise correlation signal comprises a surface acoustic wave device.

9. A receiver apparatus as recited in claim 1 wherein said means for generating a noise statistic signal comprises processor means which generates the noise statistic signal by solving the equation:

$$\sqrt{E}\, s(t) = \frac{N_o}{2} g(t) + \int_{T_i}^{T_f} K_c(t,u)\, g(u)\, du$$

where E is the amplitude of the data signal, s(t) is the data signal, $N_o$ is the receiver apparatus noise figure g(t) is the noise statistic signal at time t, $K_c(t,u)$ is the covariance noise signal, g(u) is the noise statistic signal at time u, $T_i$ is the start time for the sample period interval and $T_f$ is the finish time for the sample period interval.

10. A receiver apparatus as recited in claim 9 wherein said processor means comprises a digital microprocessor which iteratively solves said equation to produce a digital representation of the noise statistic signal and a digital-to-analog converter connected to receive the digital noise statistic signal from the microprocessor and generate the noise statistic signal in analog form.

11. A receiver apparatus for extracting a data signal from a received signal which has included therein an interfering noise signal, comprising in combination, (a) means for recovering a carrier signal from the received signal, the recovered carrier signal corresponding to the carrier signal modulated to carry the data signal, (b) means for mixing the recovered carrier signal with the received signal to produce a baseband signal which includes both the data signal and the noise signal, (c) means for generating a recovered modulated carrier signal by mixing the data signal with the recovered carrier, (d) means for deriving the noise signal by mixing the recovered modulated carrier signal with the received signal, (e) means for generating a noise correlation signal by operating on the derived noise signal, the noise correlation signal representing an approximation of the correlation of the noise signal over a sample period having a predetermined duration, (f) means for generating a squared mean signal by operating on the derived noise signal, the squared mean signal representing an approximation of the square of the mean of the noise signal over the sample period, (g) means for generating a covariance noise signal by producing the difference of the noise correlation signal and the squared mean signal, (h) means for converting the covariance noise signal from analog to digital format to produce a digital covariance noise signal, (i) automatic gain control means connected to receive the data signal and generate a constant amplitude data signal and a gain control signal representing the gain value of said automatic gain control means, said gain value proportional to the receiver apparatus variable noise figure, (j) means for converting the gain control signal from analog to digital format to produce a digital gain control signal, (k) means for converting the data signal from analog to digital format to produce a digital data signal, (l) digital processing means for generating a digital noise statistic signal derived from the digital covariance noise signal, the digital gain control signal, the digital data signal and a noise figure parameter stored in said processing means representing the receiver apparatus fixed noise figure, the noise statistic signal adapted to reduce the interfering effect of the noise signal when the noise statistic signal is mixed with the baseband signal, (m) means for converting the digital noise statistic signal from digital to analog format to produce an analog noise statistic signal, and (n) means for mixing the baseband signal and the analog noise statistic signal to produce the data signal having the noise signal essentially removed therefrom.

12. A receiver apparatus as recited in claim 11 wherein said means for recovering a carrier signal comprises a phase locked loop circuit having the received signal input thereto.

13. A receiver apparatus as recited in claim 11 wherein said means for generating a squared mean signal comprises:

(a) means for generating a mean baseband signal by continuously integrating the baseband signal over a predetermined time interval, and (b) means for producing the squared mean signal by squaring the mean baseband signal.

14. A receiver apparatus as recited in claim 11 wherein said digital processor means comprises a microprocessor programmed to generate the digital noise statistic signal by repetitively solving the equation:

$$\sqrt{E}\, s(t) = \frac{N_o}{2} g(t) + \int_{T_i}^{T_f} K_c(t,u)\, g(u)\, du$$

where E is the amplitude of the data signal, s(t) is the data signal, $N_o$ is the receiver apparatus noise figure derived from the noise figure parameter and the digital gain control signal, g(t) is the noise statistic signal at time t, $K_c(t,u)$ is the covariance noise signal, g(u) is the noise statistic signal at time u, $T_i$ is the start time for the sample period interval and $T_f$ is the finish time for the sample period interval.

15. A receiver apparatus as recited in claim 11 wherein said means for generating a noise correlation signal comprises, (a) means for generating a transform signal from the derived noise signal, the transform signal representing an approximation of the Fourier transform of the noise signal, (b) means for generating a squared transform signal by squaring the transform signal, (c) means for generating a product signal by multiplying the squared transform signal by the quantity $2\pi$, and (d) means for producing the noise correlation signal by generating the inverse Fourier transform of the product signal.

16. A receiver apparatus as recited in claim 15 wherein said means for generating a transform signal comprises a surface acoustic wave device.

17. A receiver apparatus as recited in claim 15 wherein said means for generating a squared transform signal is an amplifier.

18. A receiver apparatus as recited in claim 15 wherein said means for generating a product signal comprises an amplifier.

19. A receiver apparatus as recited in claim 15 wherein said means for producing the noise correlation signal comprises a surface acoustic wave device.

20. A method for extracting a data signal from a received signal wherein an interfering noise signal is superimposed on the data signal, comprising the steps of:

(a) generating a recovered carrier signal derived from the received signal, (b) mixing the recovered carrier signal with the received signal to produce a baseband signal which includes both the data signal and the noise signal, (c) mixing the recovered carrier signal with the data signal to produce a recovered modulated carrier signal, (d) mixing the recovered modulated carrier signal with the received signal to produce an approximate noise signal similar to the interfering noise signal, (e) processing the approximate noise signal to produce a noise correlation signal representing an approximation of the correlation of the noise signal over a sample period having a predetermined duration, (f) processing the baseband signal to produce a squared mean signal representing an approximation of the square of the mean of the noise signal over the sample period, (g) subtracting the squared mean signal from the noise correlation signal to produce a covariance noise signal representing an approximation of the covariance of the noise signal over the sample period, (h) generating a noise statistic signal derived from a combination of the covariance noise signal, the data signal and a noise figure signal representing the noise figure of apparatus utilized for processing the data signal, the noise statistic signal adapted to reduce the interfering effect of the noise signal when the noise statistic signal is mixed with the baseband signal, and (i) mixing the noise statistic signal with the baseband signal to produce the data signal having the noise signal essentially separated therefrom.

21. A method for extracting a data signal from a received signal as recited in claim 20 wherein the step of processing the approximate noise signal to produce a noise correlation signal comprises the steps of:

(a) generating a transform signal by producing the Fourier transform of the approximate noise signal, (b) generating a squared transform signal by squaring the transform signal, (c) generating a product signal by multiplying the squared transform signal by a constant $2\pi$, and (d) generating the noise correlation signal by producing the inverse Fourier transform of the product signal.

22. A method for extracting a data signal from a received signal as recited in claim 20 wherein the step of processing the baseband signal to produce a squared mean signal comprises the steps of:

(a) continuously integrating the baseband signal over the sample period to produce a mean baseband signal, and (b) squaring the mean baseband signal to produce the squared mean signal.

* * * * *